(12) United States Patent
Jagtiani et al.

(10) Patent No.: US 7,739,137 B2
(45) Date of Patent: Jun. 15, 2010

(54) PROJECT MANAGEMENT SOFTWARE

(76) Inventors: Suresh Jagtiani, Behramji Mansion, 4th Floor, Sir P.M. Road, Fort, Mumbai (IN) 400 001; David Dulaney, 301 Grand Ave., Des Moines, IA (US) 50309

( * ) Notice: Subject to any disclaimer, the term of this patent is extended or adjusted under 35 U.S.C. 154(b) by 396 days.

(21) Appl. No.: 11/051,386

(22) Filed: Feb. 4, 2005

(65) Prior Publication Data

US 2006/0178922 A1    Aug. 10, 2006

(51) Int. Cl.
G06Q 10/00    (2006.01)
(52) U.S. Cl. .......................................................... 705/8
(58) Field of Classification Search ................ 705/8, 705/9
See application file for complete search history.

(56) References Cited

U.S. PATENT DOCUMENTS

| | | | |
|---|---|---|---|
| 5,117,353 A | | 5/1992 | Stipanovich |
| 5,291,397 A | * | 3/1994 | Powell ........................ 700/97 |
| 5,325,292 A | | 6/1994 | Crockett |
| 5,381,332 A | * | 1/1995 | Wood .......................... 705/8 |
| 5,765,140 A | * | 6/1998 | Knudson et al. ............... 705/9 |
| 5,793,632 A | * | 8/1998 | Fad et al. .................... 705/400 |
| 5,848,394 A | * | 12/1998 | D'Arrigo et al. ............... 705/8 |
| 5,890,131 A | * | 3/1999 | Ebert et al. .................... 705/7 |
| 5,907,490 A | * | 5/1999 | Oliver ........................ 700/90 |
| 5,911,134 A | | 6/1999 | Castonguay |
| 5,923,552 A | * | 7/1999 | Brown et al. ................ 700/100 |
| 6,049,776 A | * | 4/2000 | Donnelly et al. ............... 705/8 |
| 6,101,481 A | * | 8/2000 | Miller ............................ 705/9 |
| 6,351,734 B1 | * | 2/2002 | Lautzenheiser et al. ........ 705/8 |
| 6,675,149 B1 | * | 1/2004 | Ruffin et al. ................... 705/8 |
| 7,006,978 B2 | * | 2/2006 | Lineberry et al. .............. 705/8 |
| 7,062,449 B1 | * | 6/2006 | Clark ........................... 705/9 |
| 7,376,577 B1 | * | 5/2008 | Yamadera et al. .............. 705/9 |
| 2005/0102157 A1 | * | 5/2005 | Soma et al. .................... 705/1 |

OTHER PUBLICATIONS

User's Manual "Your Guide to Price S", copyright 1998, Price Systems LLC, pp. 1-462.*
Lofton, Waymon D; Monteith, Michael Douglas, "Collaborative Estimating" 2004, Morgantown, AACE International Transactions, p. ES11, 3 pgs., ProQuest ID 671955051.*
"Project Estimation Process (Expert Mode)", Jan. 4, 2005, Document PRX-PP-01, v1.1, pp. 1-3, published by SSC San Diego Systems Engineering Process Office (SEPO).*
Banton, Paul; "There's nothing wrong with guesswork", May 31, 1990, Computer Weekly, n1216, p. 18(1), Dialog 04608937.*

(Continued)

Primary Examiner—Jonathan G Sterrett (57) ABSTRACT

A method for managing fees and profitability is provided by calculating the number of hours that employees should be assigned to a specific project and stay within the available fees. The method derives the direct labor from fees, profitability, direct expenses, and overhead. The direct labor is then used to determine staff hours that can be spent on a project within the available fees for the project. The process also assigns hours per day for individual staff members to work on a project. The program reschedules labor when there is a change in any of the variables that comprise project fees. The program also evaluates working days available for each staff member, and considers holidays and individual leaves or vacation.

1 Claim, 9 Drawing Sheets

OTHER PUBLICATIONS

"Coopers & Lybrand introduces advanced systems development environment and architecture", May 1993, CAD/CAM Update, v5, n5, Dialog 02073835.*

Giammalvo, Paul D; "Construction Specifications Institute's Masterformat: A tool for total cost management", Jul. 1994, Cost Engineering, v36n7, pp. 11-17, Dialog 00874062.*

"Project Guide for Windows Simplifies Planning", Jul. 13, 1992, News Release, Dialog 01197067.*

"Computer Associates Introduces Comprehensive Project Estimation and Planning Solution", Feb. 20, 1990, News Release, p. 1, Dialog 01065148.*

Business Wire, "In a blink, Model Estimating Turns Rough Ideas into Solid Numbers; The software is one Highlight of Timberline's Precision Collection Extended Version 6.0 Release", Jun. 21, 2001, Dialog 08736677.*

PR Newswire, "Ross Systems Announces Project Administration and Accounting System", Dec. 18, 1998, Dialog 06016675.*

Business Wire, "LBMS and Micro-frame announce marketing and development partnership; Market leading vendors provide integrated solutions for enterprise process, project and resource management for users of Microsoft Project", Jul. 1, 1997, p. 07010055, Dialog 05112419.*

Jorgensen, Magne; "Top Down and bottom up expert estimation of software development effort", Jan. 1, 2004, Information and Software Technology, v46n1, pp. 3-16, Dialog 02753489.*

Garcia, Mario; et.al. "A knowledge base system used to estimate schedule, effort, staff, documentation and defects in a software development process", ISAI/IFIS 1996, Copyright 1996 ITESM, pp. 306-314.*

Ferens, Daniel; "Parametric Estimation—Past, Present & Future", 19th PRICE European Symposium, Oct. 20, 1999, Air Force Research Laboratory, Information Directorate, Wright Research Site, pp. 1-10.*

Simmons, Dick B; "Manager Associate", Jun. 1993, IEEE Transactions on Knowledge and Data Engineering, vol. 5, No. 3, pp. 426-438.*

"Software Project Management", Online Course Syllabus for Course Q7503, Columbia University, Aug. 21, 2004, pp. 1-8.*

Lerouge, Cynthia; "Managing by Projects", Nov. 1999, Strategic Finance, Montvale, vol. 81, Iss. 5, p. 68, 13 pgs, ProQuest ID 46586265.*

"Planning/Control of Professional Staff Resources" Harry W Jarnagan. AACE International Transactions. Morgantown: 2004. p. PM11, 6 pg.*

"Very little movement on hours and holiday entitlement" Anonymous. Bargaining Report. London: Sep. 2001., Iss. 219; p. 14, 5 pgs.*

"Toward an efficiency week" Robert LaJeunesse. Challenge. Armonk: Jan./Feb. 1999.vol. 42, Iss. 1; p. 92, 18 pgs.*

"The New Workweek" Michael A Verespej, Nov. 6, 1989, IndustryWeek, 238, 21, ABI/INFORM Global, p. 11.*

PRICE User Manual "Your Guide To PRICE S", © 1998 PRICE Systems LLC, pp. 1-452.*

"Cost-estimation by analogy as a good management practice" AJC Cowderoy, JO Jenkins—Software Engineering, 1988 Software Engineering 88.*

Magne Jørgensen , and Dag I. K. Sjøberg; "The impact of customer expectation on software development effort estimates". International Journal of Project Management vol. 22, Issue May 4, 2004, pp. 317-325.*

Ostwald et al.; "A survey on software estimation in the Norwegian industry" Software Metrics, 2004. Proceedings. 10th International Symposium, Publication Date: Sep. 14-16, 2004.*

Briand, L. C. and I. Wieczorek (2002). Resource estimation in software engineering. Encyclopedia of software engineering. J. J. Marcinak. New York, John Wiley & Sons: 1160-1196.*

Hughes, Robert T; "Expert Judgment as an Estimating Method", 1996, Information and Software Technology, 38, pp. 67-75.*

Boehm, Barry W.; "Software Engineering Economics", (C)1984, IEEE, IEEE Transactions on Software Engineering, vol. SE-10, No. 1, pp. 4-21.*

Heemstra, F J; "Software Cost Estimation", © 1992 Butterworth Heineman, vol. 34, No. 10, pp. 627-639.*

"Top-down and bottom-up expert estimation of software development effort" M Jørgensen—Information and Software Technology, © 2003—Elsevier.*

Zwikael, et al., "Evaluation of Models for Forecasting the Final Cost of a Project", Mar. 2000, Project Management Journal, vol. 31, No. 1, pp. 53-87.*

Barry, et al. "Software Project Duration and Effort: An Empirical Study", 2002, Information Technology and Management 3, 113-136, © 2002 Kluwer Academic Publishers.*

* cited by examiner

Figure 2

Figure 3: Calculating the Direct Labor Amount Available for each Phase Flow Path 'A'

Figure 6: Calculating Total Hours Per Phase Path 'D' (50)

Output A (24)

Phase 05a – Selected for demo

| Ph. No. | Phase Name | % of Fee | Amt. Per Phase ($) |
|---|---|---|---|
| 03 | Schematic Design | 4.5 | 1,765.38 |
| 04 | Design Development | 18 | 7,061.53 |
| 05a | Construction Docume | 53 | 20,792.28 |
| 05b | Quality Review | 2 | 784.61 |
| 06 | Bid/Negotiate | 4.5 | 1,765.38 |
| 07a | Construction Admin a | 6 | 2,353.84 |
| 07b | Construction Admin b | 12 | 4,707.69 |

Fig. 1

Output C (44)

Phase 05a Construction Docs

| Staff% | Staff Members | Rate / Hr($) | Lab. Rate($) |
|---|---|---|---|
| 41 | Fleming, Daryl | 22.02 | 9.03 |
| 41 | Henry, Silvans | 14.42 | 5.91 |
| 3 | Moore, Ray | 16.43 | 0.49 |
| 15 | Williams, Theo | 34.62 | 5.19 |

100.00 Total % of Staff   Total Labor Rate / Hr. $   20.63

Fig. 2

Output A / C (50)

Staffing Plan for : Phase 05a Construction Documents - 0.00 % Complete
Start Date 14-Feb-2004  End Date  28-Jun-2004  Rem. Fee $ :  20,792.28

| Staff% | Staff Members | Rate / Hr($) | Lab. Rate($) | Hrs / Phase | Hrs / Day |
|---|---|---|---|---|---|
| 41 | Fleming, Daryl | 22.02 | 9.03 | 413.31 | 4.35 |
| 41 | Henry, Silvans | 14.42 | 5.91 | 413.31 | 4.35 |
| 3 | Moore, Ray | 16.43 | 0.49 | 30.24 | 0.32 |
| 15 | Williams, Theo | 34.62 | 5.19 | 151.21 | 1.59 |

100.00 Total % of Staff   Total Labor Rate / Hr. $   20.63   1,008.07 Total Hr/Ph.

Clear | Clear All | Wk. Days for Ph. [95] Rem. Wk.Days for Ph.

The Direct labor fee per phase divided by the average hourly rate gives the the number of Hours available for completing the Phase.

Example:
Phase 05a
Labor amount = $20,792.28
Hourly Rate for this Phase = $20.63

$20,792.28 / $20.63= 1,008.07 Hours

Output D (50)

Figure 8: Calculating the Working Days Flow Path 'E' (82)

| Path 'E' – Step I (70) | | | |
|---|---|---|---|
| Evaluate no of days between Start Days & End Days (Both Days Inclusive) | | Ph. No. / Phase Name / % of Fee / Start Date / Finish Date:<br>03 Schematic Design  4.5  25-Oct-03  15-Dec-03<br>04 Design Development  18  16-Dec-03  13-Feb-04<br>05a Construction Docume  53  14-Feb-04  28-Jun-04<br>05b Quality Review  2  29-Jun-04  09-Jul-04<br>06 Bid/Negotiate  4.5  10-Jul-04  11-Aug-04<br>07a Construction Admin a  6  12-Aug-04  28-Feb-05<br>07b Construction Admin b  12  01-Mar-05  15-Sep-06<br>Fig. 1 | The total number of days available between the Start date and the Finish Date for each Phase is calculated. See Fig 2<br><br>Output E (82) |

Figure 9: Calculating Hours Per Day For Each Staff Member Path 'F' (90)

Output F (60) → Hours Per Phase for Each staff Member (60)

Output E (82) → Total working Days Per Phase (82)

Staffing Plan for : Phase 05a Construction Documents - 0.00 % Complete
Start Date 14-Feb-2004 End Date 28-Jun-2004 Rem. Fee $ : 20,792.28

| Staff% | Staff Members | Rate / Hr($) | Lab. Rate($) | Hrs / Phase | Hrs / Day |
|---|---|---|---|---|---|
| 41 | Fleming, Daryl | 22.02 | 9.03 | 413.31 | 4.35 |
| 41 | Henry, Silvans | 14.42 | 5.91 | 413.31 | 4.35 |
| 3 | Moore, Ray | 16.43 | 0.49 | 30.24 | 0.32 |
| 15 | Williams, Theo | 34.62 | 5.19 | 151.21 | 1.59 |

100.00 Total % of Staff    Total Labor Rate / Hr. $  20.63    1,008.07 Total Hr./Ph.
Clear   Clear All   Wk. Days for Ph.  95   Rem. Wk.Days for Ph.  95
Percentage assigned to staff totals 100

Total hours per phase per day for each selected staff member (90) is calculated.

Example:

Total hours per phase / total days available.

(413.31 / 95 = 4.35)

PROJECT MANAGEMENT SOFTWARE

BACKGROUND OF THE INVENTION

1. Field of the Invention

This invention relates generally to software systems for managing fees and profitability, and specifically to a software system that manages fees and profitability by calculating the number of hours that employees should be assigned to a specific project and stay within the available fees.

2. Background Information

The inventors have spent most of a long career managing a large staff of professionals, constantly trying to assure that the time spent on projects fits within the fee negotiated with client. During that period the inventor was constantly looking for available software that would improve the ability to control the hours assigned to projects. Unfortunately the available software all have short comings in that the user is required to predict the hours to be assigned, rather than the system defining appropriate hours. These conventional methods of scheduling employees have no direct control on the projects profitability. Their attempts to achieve the projected profit in this way have several disadvantages, including reliability and accuracy. The prior art method of assigning staff to a project requires estimating and inputting the amount of time that the assigned staff would need to complete the project. These were based on such factors as previous experience with similar projects, or tables that would estimate the labor for similar types of projects. Once again, this inputted data does not allow for a dynamic management of fees and/or profitability.

For example, these prior art systems can result in the over-scheduling of hours such that the project does not stay within the fees, and, subsequently, is not profitable. Under-scheduling leads to similar problems and affects profitability as well. In addition, these methods require a user to monitor time variations (e.g. variations due to vacations, leave or holidays) and manually adjust the schedule accordingly. Keeping track of time variations for each employee and manually entering these changes is not only time intensive but also unreliable since they depend on formulas or procedures that may or may not be responsive to the actual fees available. This is why prior art project management programs cannot automatically adjust employee hours when there is a change in one of the other variables (profitability, direct expenses, or overhead) that make up fees. If one of these variables changes, the user must manually re-input employee hours in order to maintain net fees. These prior art systems do not dynamically modify the assigned hours when any of these variables change.

SUMMARY OF THE INVENTION

The problems of the prior art are solved by this invention, which is a method of scheduling labor (staff) based on available fees. With this invention the hours assigned to individuals are calculated based on actual fees and actual individual billing rates. The fees are converted to direct labor dollars. Direct labor rates are determined from the formula: fees=profitability+direct expenses+overhead+direct labor. The direct labor rate is used by the program to derive a schedule for each staff member assigned to a project. The resulting schedule allows the project to be carried out while remaining within available fees, managing profitability. If any of the other variables (profitability, direct expenses, overhead) change during the course of the project, the program can dynamically reschedule staff to allow the project to be completed within the available fees.

In particular, the program monitors the profit being generated from a project and ensures that it remains constant by re-scheduling the labor assigned to the project to remain within available fees. In addition, the program provides for variability of profit goals, allowing a user to increase or decrease a project's profit goals at any time after the start of the project. This is done by the proposed invention dynamically re-scheduling not only the labor, but also any of the other parameters like overhead and direct expenses.

The program also accounts for each individual staff member's working schedule. For instance, the inventions scheduling of a staff member to work on a phase of a project accounts for any planned utilization, vacations, leave, holidays or other contingencies planned by the staff member.

It is an object of the present invention to provide a project management system that derives the amount of time an employee can work on a phase of a project within available fees.

It is an object of the present invention to provide a project management system that manages fees and profitability by calculating the number of hours employees can spend on a specific task and stay within available fees.

It is an object of the present invention to provide a scheduling program that can quickly adjust for any change in fees, overhead, expenses, or profitability.

It is an object of the present invention to provide a scheduling program that automatically accounts for any variations in an individual staff member's schedule (i.e. due to vacations, leave, or holidays).

These and other objects of the present invention will become apparent to those skilled in the art upon reference to the following specification, drawings, and claims.

DETAILED DESCRIPTION OF THE INVENTION

In general terms, the present invention is a project management system for calculating the number of hours that a particular employee can spend on a specific project and stay within available fees.

The traditional method of scheduling labor involves estimating and inputting the amount of direct labor that will be used to complete a particular project. Direct labor is estimated by using a variety of tools, including previous experience with similar projects, and tables of data regarding labor rates for similar projects or tasks. Such data maybe available in the public domain for different industries and services. All such methods of predicting hours are approximate at best.

The present invention uses a different approach for scheduling labor, as it determines the direct labor that will be required to complete a project while staying within fees and then schedules labor accordingly. In other words, this direct labor is used to schedule staff members assigned to a project so that the amount spent on labor stays within the available fees.

Figure 1:
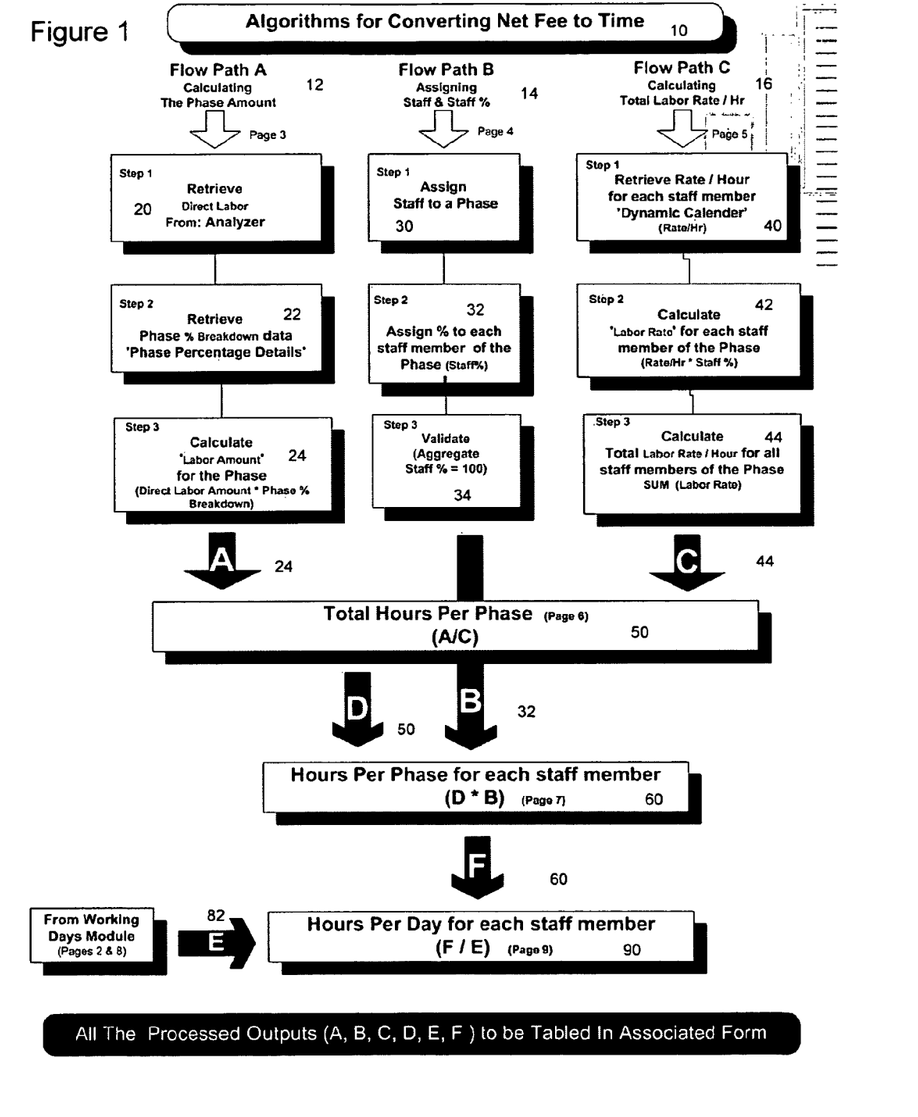
FIG. 1 is a general flow chart depicting the overall operation of the scheduling method.

In particular, FIG. 1 shows a flow chart depicting the overall operation of the program that converts net fees to time 10. There are three main flow paths A (12), B (14), C (16) carried out by the program.

Flow path A (12) determines the labor amount 24 for a particular phase of a project. Calculation of the labor amount 24 begins with retrieval of direct labor 20. Direct labor 20 is determined from the following formula: Fees=Overhead+Expenses+Profits+Direct Labor. Each project is divided into separate phases (e.g. planning, design, and implementation), and each phase is assigned a percentage of the project 22, such that all phases together are 100% of the project. The labor amount 24 for a phase is calculated by multiplying direct labor amount 20 by the percent breakdown of the phase 22.

In flow path B (14), individual staff members are assigned 30 to the phase and staff percentages are assigned 32 to each staff member of the phase. These assignments are validated 34 such that the aggregate staff percentage for a project phase is 100%.

Flow path C (16) calculates the total labor rate per hour. First, the rate per hour 40 is retrieved for each staff member assigned to the phase. Generally, hourly billing rates are determined by dividing the total salary of a staff member by the total number of working hours in a year. Then, the labor rate 42 for each staff member of the phase is calculated by multiplying the staff member's rate per hour 40 by the staff member's percentage of the phase 32. Next, the total labor rate per hour 44 for all staff members of the phase is determined by adding all of the labor rates 42.

Flow paths A (12) and C (16) converge to determine the total hours per phase 50. Total hours per phase is determined by dividing the labor amount 24 by the total labor rate per hour 44.

To determine the hours per phase for each staff member 60, the total hours per phase 50 is multiplied by the percentage than the individual staff member is assigned to the phase 32.

Figure 2:
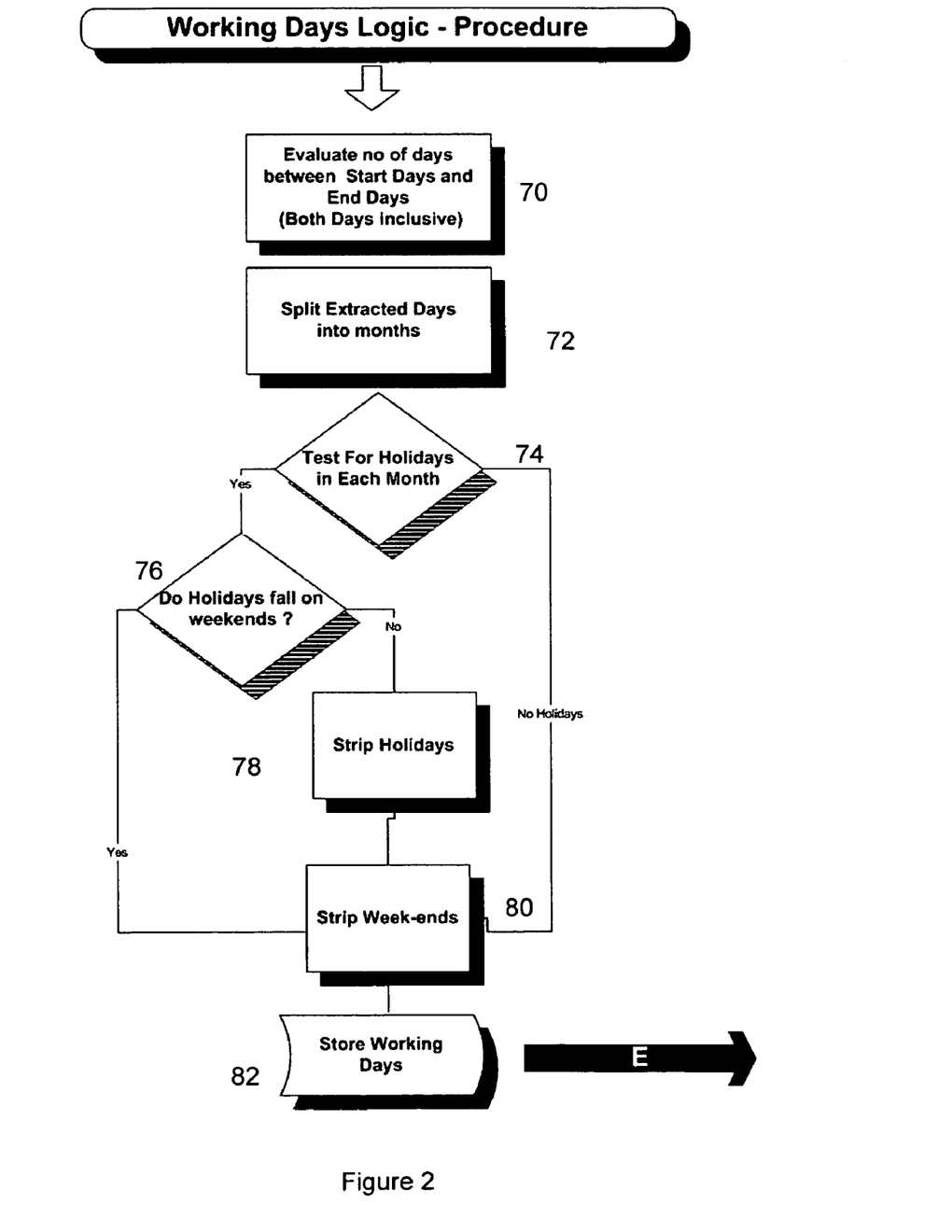
FIG. 2 is a flow chart depicting the determination of working days.

To determine the hours per day for each staff member 70, the number of working days 82 must be determined. FIG. 2 is a flow chart demonstrating the calculation of the number of working days 82. As shown in FIG. 2, the number of days between the start date and the end date of a project phase is evaluated 70 (both start and end date are inclusive). The number of days 70 is split into months 72. Each month is then tested for holidays 74. Next, it is determined whether any of the holidays fall on weekends 76. Non-weekend holidays are stripped 78, as are weekends 80. The resulting number is the working days for the project phase 82.

As seen in FIG. 1, the working days 82 is used to determine the hours per day for each staff member 90. The hours per phase for the staff member 60 is divided by the working days 82.

FIGS. 3-9 show an example of the calculations described above. In this example, the program determines the number of hours assigned to employee Fleming during phase 053a (construction administration) of the Allendale County Courthouse project. FIGS. 3-9 include screen shots generated by the program.

Figure 3:
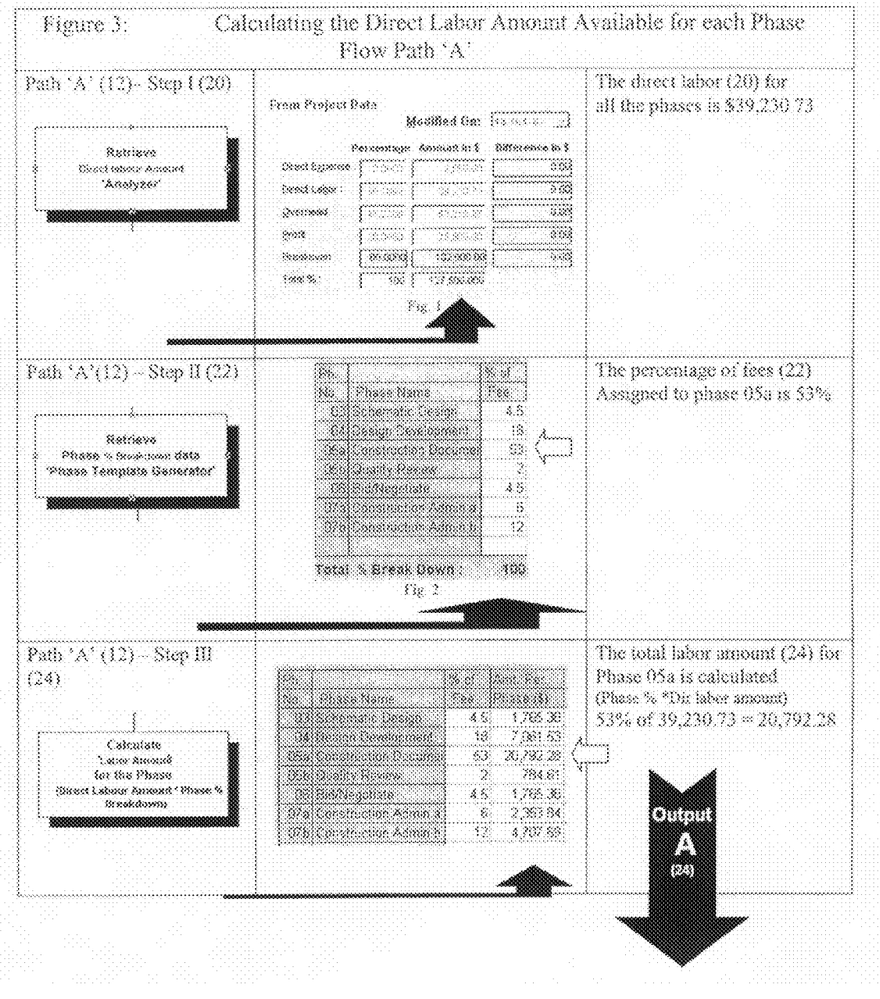
FIG. 3 is a chart depicting the calculation of the direct labor amount available for each phase, as used in flow path A of FIG. 1.

FIG. 3 demonstrates how the labor amount 24 is determined in flow path A (12) of FIG. 1. The direct labor 20 for all the phases is retrieved, and, in this example, is $39,230.73. Next, the phase percentage breakdown 22 is retrieved. The percentage of fees assigned to this particular phase 05a is fifty-three percent. The labor amount 24 for phase 05a is calculated is $20,792.28 ($39,230.73*53%).

Figure 4:
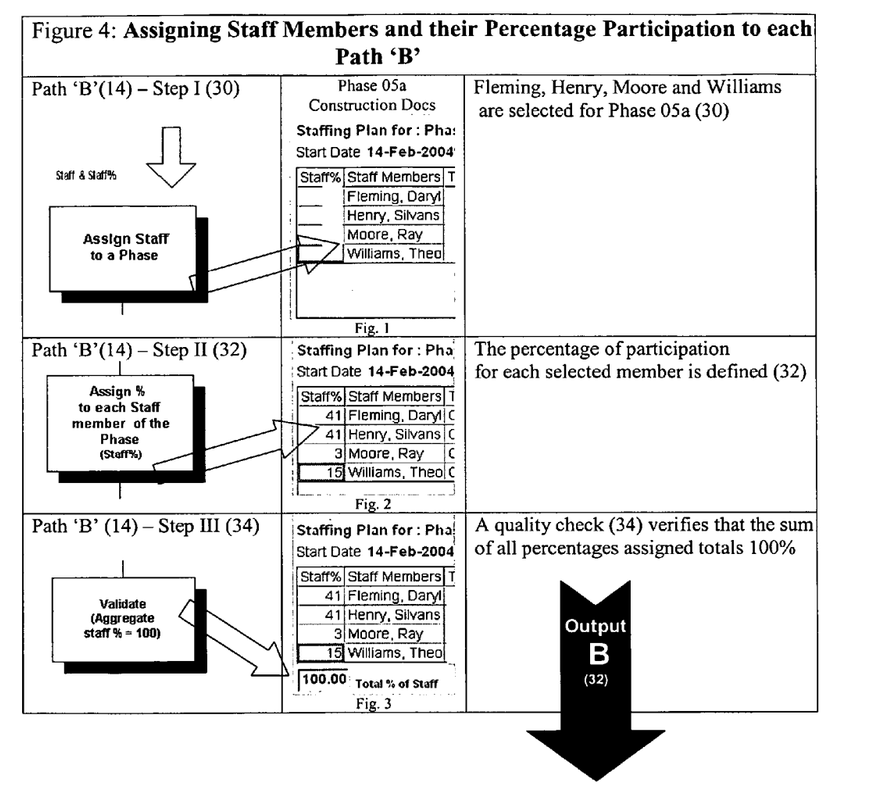
FIG. 4 is a chart depicting the assignment of staff members and their percentage participation to each phase, as used in flow path B of FIG. 1.

FIG. 4 is an example of how staff members are assigned 30 and their percentage participation 32 is assigned to each phase, as shown in flow path B (14) of FIG. 1. In this example, Fleming, Henry, Moore and Williams are selected for phase 05a. The percentage of participation for each selected staff member is defined (Fleming=41%, Henry=41%, Moore=3%, Williams=15%). Finally, a quality check validates 34 that the sum of all the percentages assigned totals 100%.

Figure 5:
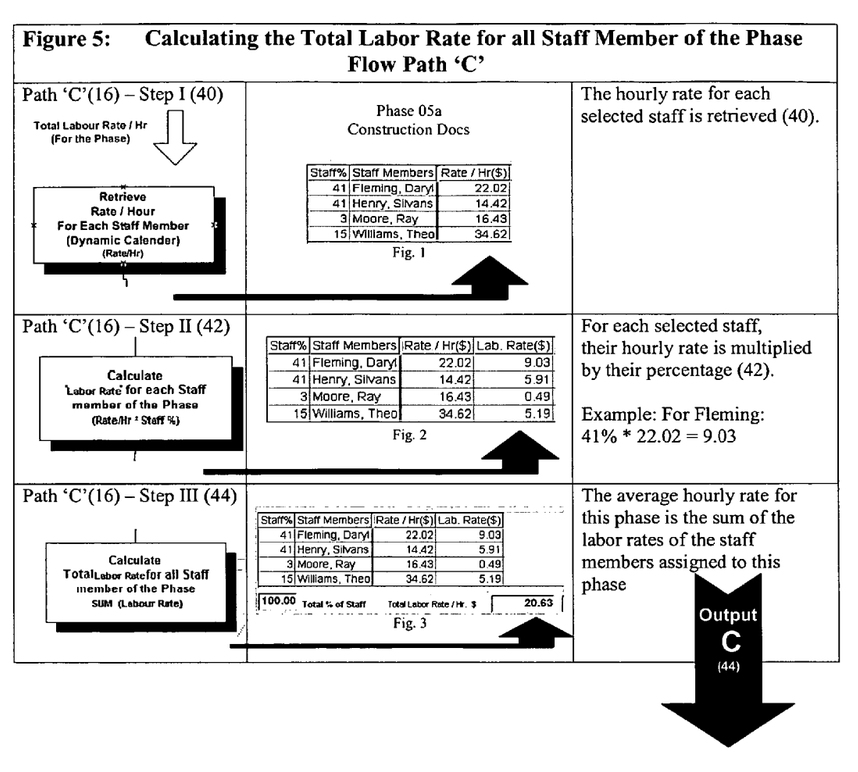
FIG. 5 is a chart depicting the calculation of the total labor rate per hour for all staff members assigned to a phase, as used in flow path C of FIG. 1.

FIG. 5 is an example of the determination of the total labor rate/hour 44 for all staff members of the phase, as shown in flow path C (16) of FIG. 1. First, the hourly rate 40 for each selected staff member is retrieved. In this example, Fleming's hourly rate is $22.02. For each selected staff member, their hourly rate is multiplied by their percentage 32 to determine the labor rate 42. In FIG. 5, Fleming's labor rate 42 is $9.03 ($22.02*41%=$9.03). Finally, the hourly rate for the phase 44 is determined by adding the labor rates of all the staff members assigned to the phase. In this example the hourly rate for the phase 44 is $20.63.

Figure 6:
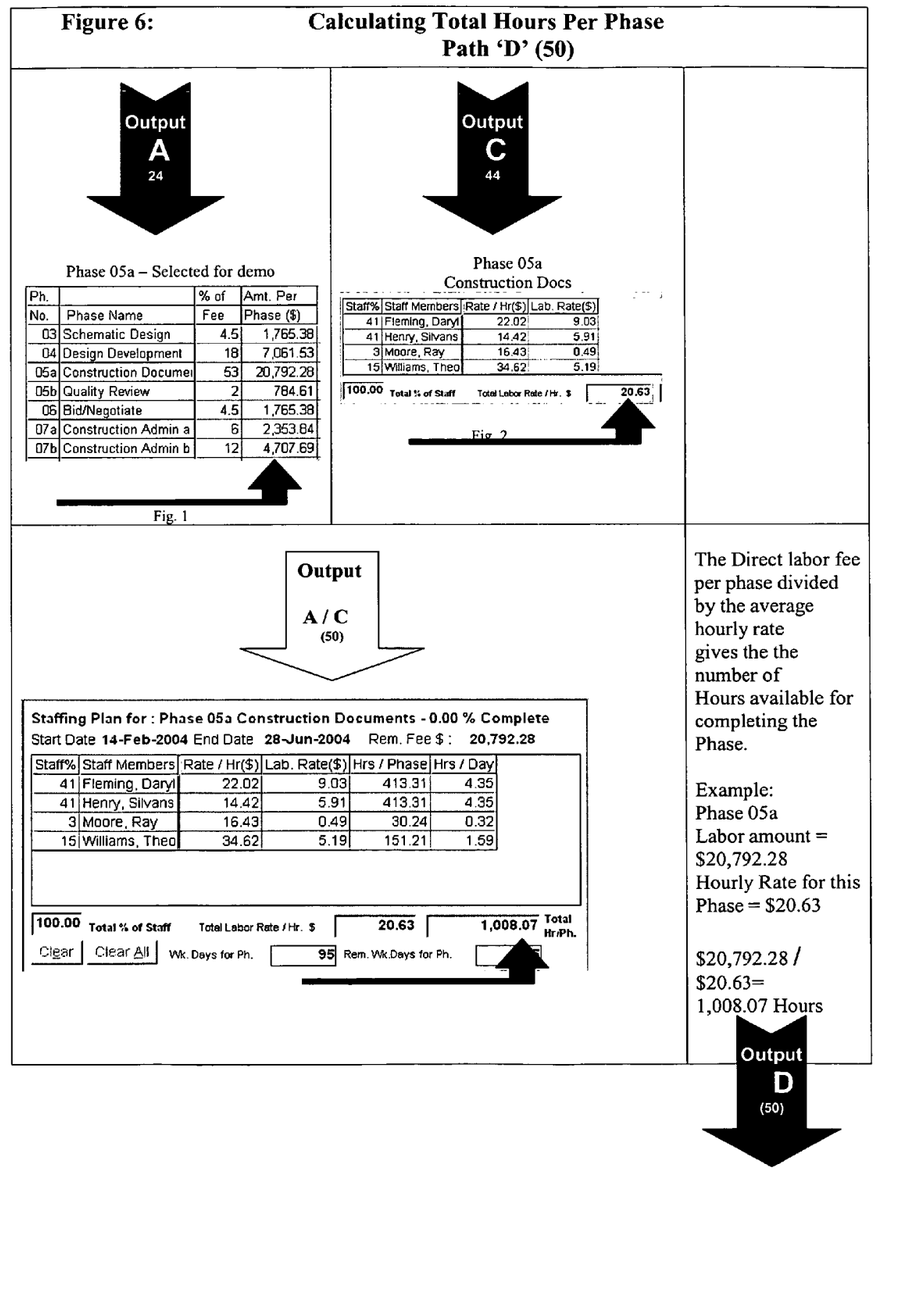
FIG. 6 is a chart depicting the total number of hours per phase, as used in flow path D of FIG. 1.

FIG. 6 provides an example of the calculation of the total hours per phase 50. The labor amount 24 from flow path A ($20,792.28) is divided by the total labor rate per hour 44 of flow path C ($20.63). In this example, the total hours for phase 05a is $20,792.28/$20.63, or 1,008.07 hours.

Figure 7:
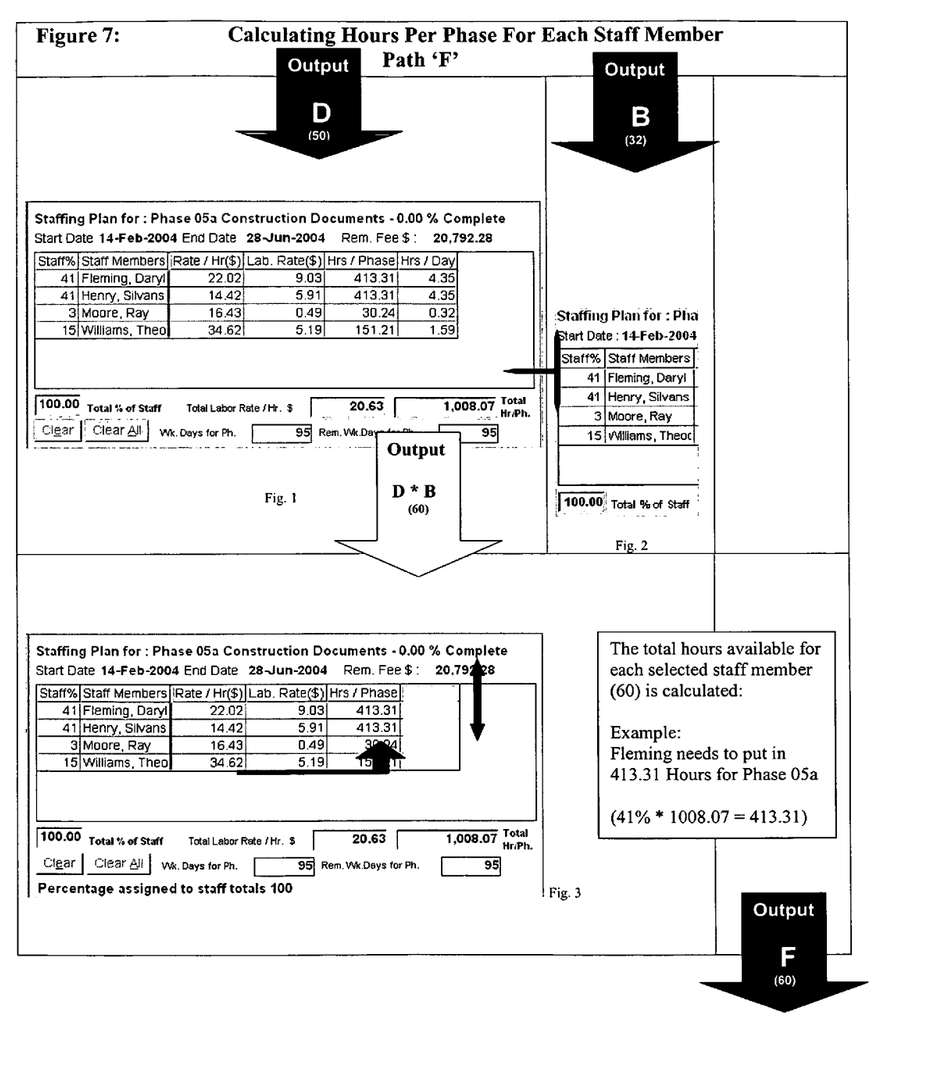
FIG. 7 is a chart depicting the calculation of hours per phase assigned to each staff member, as used in flow path F of FIG. 1.

FIG. 7 is an example of how the hours per phase 60 for each staff member is determined. The total hours for the phase 05a (1,008.07 hours) is multiplied by the individual staff member's percentage 32 assigned to the phase. In this example, Fleming's percentage is 41%. Accordingly, the total hours in phase 05a that Fleming is assigned is 413.31 (1,0087.07*41%).

Figure 8:
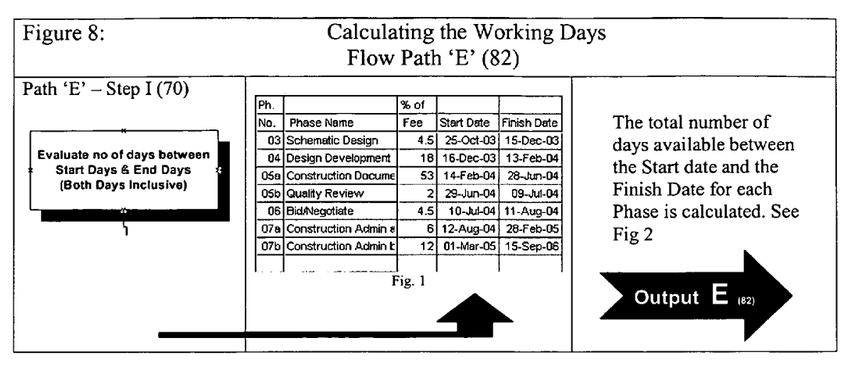
FIG. 8 is a chart depicting the calculation of working days in a phase, as used in flow path E of FIG. 1.
Figure 9:
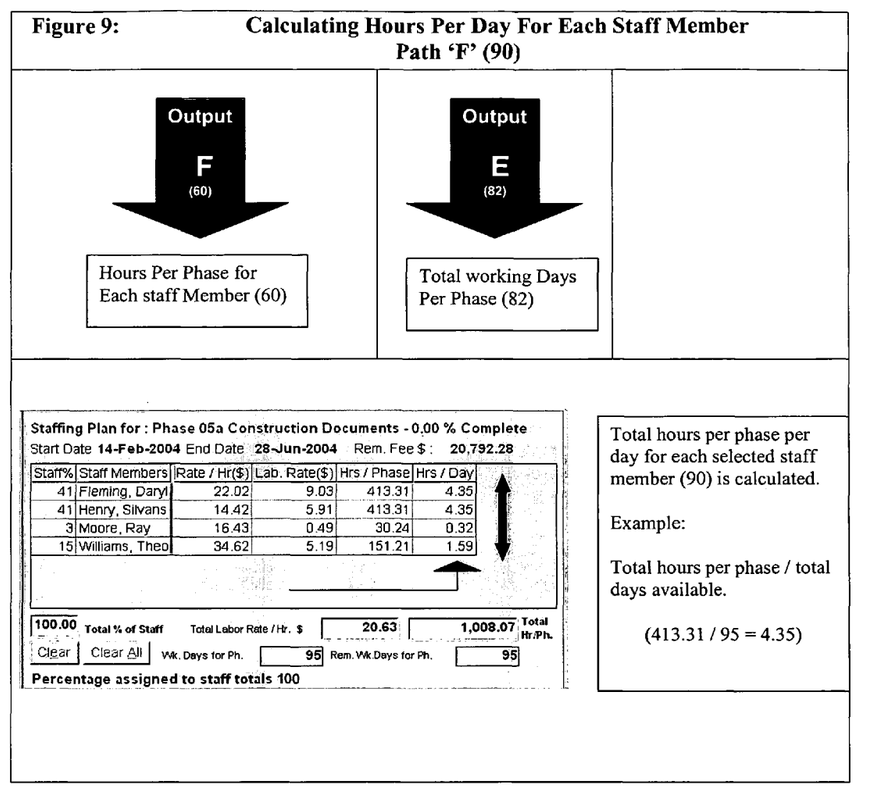
FIG. 9 is a chart depicting the calculation of hours per day assigned to each staff member, as used in flow path F of FIG. 1.

FIG. 8 is an example of the calculation of working days, as shown in FIG. 2. FIG. 9 is an example of the calculation of the hours per day for each staff member using the working days determination from FIGS. 2 and 8. The hours per phase for each staff member 60 is divided by the total working days 82. In this example, Fleming is assigned to work on phase 053a for 4.35 hours per day (413.21/95).

The following tables illustrate the practical application of the data created by this invention. The example reports shown in Tables 1-5, created by the invention, are based on the determination of hours assigned to staff members for a particular project phase.

TABLE 1

Phase and Finance Details

| | | | | |
|---|---|---|---|---|
| Allendale County - Courthouse SD-CA (E) (23225.01/BG-001/E) | | Est. Constr. Cost | | $ 0.00 |
| | | Gross Fee | | $127,500.00 |
| Project Manager | Williams, Theodore | Less Consult Fees | | $ 0.00 |
| Quality Review | Williams, Theodore | Less Unusual Exp. | | $ 0.00 |
| Start Date | Oct. 14, 2003 | Net Fees | | $127,500.00 |
| Summary Date | Dec. 1, 2004 | Overall % Complete | | 0% |

| Heading | Projected | Actual (14-Oct-03) | Diff |
|---|---|---|---|
| Direct Expense | $2,550 | $2,550 | $0 |
| Direct Labor | $39,231 | $39,231 | $0 |
| Overhead | $60,219 | $60,219 | $0 |
| Profit | $25,500 | $25,500 | $0 |

| | Dec | Jan | Feb | Mar | Apr | May | Jun | Jul | Aug | Sep | Oct | Nov |
|---|---|---|---|---|---|---|---|---|---|---|---|---|
| Available Work Days | 22 | 21 | 20 | 23 | 21 | 21 | 22 | 20 | 23 | 21 | 21 | 21 |
| Available Work Hours | 185 | 176 | 168 | 193 | 176 | 176 | 185 | 168 | 193 | 176 | 176 | 176 |

| Emp. No. | Emp. Name | Staff % | Rem. Hrs. | Hrs/Day | Dec | Jan | Feb | Mar | Apr | May | Jun | Jul | Aug | Sep | Oct | Nov |
|---|---|---|---|---|---|---|---|---|---|---|---|---|---|---|---|---|
| 03: Schematic Design Ph %: 4.50 25-Oct-03 15-Dec-03 Wk C %: 0 Ph Fee: $1,765 Rem. Fee: $1,765 | | | | | | | | | | | | | | | | |
| 672 | Fleming, Daryl | 12.00 | — | — | — | — | — | — | — | — | — | — | — | — | — | — |
| 999 | Moore, Ray | 3.00 | — | — | — | — | — | — | — | — | — | — | — | — | — | — |
| 430 | Williams, Theodore | 85.00 | — | — | — | — | — | — | — | — | — | — | — | — | — | — |
| | Total | 100.00 | — | — | — | — | — | — | — | — | — | — | — | — | — | — |
| 04: Design Development Ph %: 18 16-Dec-03-13-Feb-04 Wk C %: 0 Ph Fee: $7,062 rem. Fee: $7,062 | | | | | | | | | | | | | | | | |
| 672 | Fleming, Daryl | 72.00 | — | — | — | — | — | — | — | — | — | — | — | — | — | — |
| 999 | Moore, Ray | 3.00 | — | — | — | — | — | — | — | — | — | — | — | — | — | — |
| 430 | Williams, Theodore | 25.00 | — | — | — | — | — | — | — | — | — | — | — | — | — | — |
| | Total | 100.00 | — | — | — | — | — | — | — | — | — | — | — | — | — | — |
| 05a Construction Documents Ph %: 53 01-Dec-03-13-Apr-05 Wk C %: 0 PhFee: $20,792 Rem.Fee: $20,792$_1$ | | | | | | | | | | | | | | | | |
| 672 | Fleming, Daryl | 41.00$_2$ | 413$_3$ | 4:35$_4$ | 96$_5$ | 91 | 87 | 100 | 39 | — | — | — | — | — | — | — |
| 717 | Henry, Silvans | 41.00 | 413 | 4:21 | 96 | 91 | 87 | 100 | 39 | — | Remaining Fee $150,792 | | | — | — | — |
| 999 | Moore, Ray | 3.00 | 30 | 0:19 | 7 | 7 | 6 | 7 | 3 | — | — | — | — | — | — | — |
| 430 | Williams, Theodore | 15.00 | 151 | 1:35 | 35 | 33 | 32 | 37 | 14 | — | — | — | — | — | — | — |
| | Total | 100.00 | 1007 | 10:36 | 234 | 222 | 212 | 244 | 95 | — | — | — | — | — | — | — |
| 05b Quality Review Ph %: 2 14-Apr-05-24-Apr-05 WkC %: 0 Ph Fee: $785 Rem. Fee: $785 | | | | | | | | | | | | | | | | |
| 999 | Moore, Ray | 3.00 | 1 | 0:05 | | | | | | | | | | | | |

$_1$Based on the remaining fees, and the percentage assigned to Construction Administration
$_2$The hours that Daryl Fleming can apply to this phase of the project is calculated
$_3$Daryl can apply a total of 413 hours to this phase
$_4$Using the calculated days available this results in 4.35 hours per day
$_5$This is then applied to the actual days available in each month to show the hour per month that Daryl can apply (example: 96 hours in December)

Table 1 shows the hours assigned each month for each phase and for each individual for a typical project. With complete flexibility, project managers evaluate the number and distribution of hours based on the work required while ensuring profitability

TABLE 2

Staff Detail Report
Fleming, Daryl: (672)

| Project No. | Project Name | Billing Group | Department | Manager | Phase No. | Rem. Hrs. | Hrs./Day | Dec | Jan | Feb | Mar | Apr | May |
|---|---|---|---|---|---|---|---|---|---|---|---|---|---|
| Scheduled Vacation Hours | | | | | | | | 0 | 0 | 0 | 0 | 0 | 0 |
| 23225.01 | Allendale County - Courthouse SD-CA (E) | BG-001 | Engineering | Williams, Theodore | 05a | 413 | 4:35$_2$ | 96$_3$ | 91$_3$ | 87$_3$ | 100 | 39 | — |
| | | | | | 6 | 51 | 2:02 | — | — | — | — | 10 | 41 |
| | | | | | 07a | 68 | 0:29 | — | — | — | — | — | — |
| | | | | | 07b | 136 | 0:20 | — | — | — | — | — | — |

TABLE 2-continued

Staff Detail Report
Fleming, Daryl: (672)

| Project No. | Project Name | Billing Group | Department | Manager | Phase No. | Rem. Hrs. | Hrs./Day | Dec | Jan | Feb | Mar | Apr | May |
|---|---|---|---|---|---|---|---|---|---|---|---|---|---|
| 24208.00 | Columbia Airport - Expansion PhA (E) | G-001 | Engineering | Williams, Theodore | 05a | 928 | 4:33 | 100 | 96 | 91 | 105 | 96 | 96 |
| 24252.00 | Lexingon Performing Arts - PH 2 Int Rehab (E) | BG-001 | Engineering | Williams, Theodore | 05a | 62 | 1:28 | 32 | 30 | — | — | — | — |
| | Total Hours | | | | | 1,658[1] | | 228 | 217 | 178 | 205 | 145 | 137 |
| | Average Hrs. Per Day | | | | | | | 10:21 | 10:20 | 8:54 | 8:54[4] | 6:54[4] | 6:31[4] |

[1] Over the next six months Daryl Fleming needs to put in 1,658 hours
[2] The precise hours per day required for each phase assigned to him is shown
[3] The hours per month spread over the next six months is calculated and shown
[4] The total hours per day taking into consideration all the pahses assigned to him are shown with complete precision
5. Tasks assigned based on such reports over the last 10 years have been completed with almost 100% accuracy.
\* The report shows that from the month of January onwards Daryl Fleming is underutilized Table 2 is a report that summarizes employee Fleming's schedule for six months. The Allendale County Courthouse project information is included in this report, along with two other projects that employee Fleming is scheduled to work on in the six month time period. With this report adjustments can be made to specific projects to balance staff commitments.

TABLE 3

Staffing Over/Under Report

| Emp. No. | Emp. Name | Dec | Jan | Feb | Mar | Apr | May | Jun | Jul | Aug | Sep | Oct | Nov |
|---|---|---|---|---|---|---|---|---|---|---|---|---|---|
| | Available Work Days | 22 | 21 | 20 | 23 | 21 | 21 | 22 | 20 | 23 | 21 | 21 | 21 |
| | Available Work Hours | 185 | 176 | 168 | 193 | 176 | 176 | 185 | 168 | 193 | 176 | 176 | 176 |
| 423 | Clifford, Ian | 8 | (20) | (20) | 21 | 20 | 20 | (63) | (121) | (121) | (153) | (153) | (153) |
| 958 | Collins, Jeffrey | (29) | (156) | (149) | (171) | (156) | (156) | (164) | (149) | (171) | (156) | (156) | (156) |
| 447 | Cook, Thomas | 21 | 13 | 86 | 98 | 87 | 21 | 22 | 20 | 23 | (40) | (64) | (64) |
| 698 | Couch, Laura | 0 | 0 | 0 | 0 | 0 | 0 | 0 | 0 | 0 | 0 | 0 | 0 |
| 434 | Cunningham, Issac | 62 | 41 | 39 | 44 | 41 | 17 | (129) | (117) | (135) | (123) | (123) | (123) |
| 105 | Dwayne, Julio | 25 | (27) | (25) | (30) | (27) | (27) | (139) | (156) | (180) | (164) | (164) | (164) |
| 426 | Edge, Nicole | 71 | 43 | 99 | (34) | (46) | (55) | (118) | (134) | (154) | (141) | (146) | (159) |
| 439 | Edwards, Denny | (125) | (152) | (148) | (170) | (162) | (162) | (170) | (154) | (178) | (164) | (164) | (164) |
| 671 | Edwards, Larry | 0 | (36) | 51 | 39 | (61) | (115) | (154) | (149) | (171) | (156) | (156) | (156) |
| 420 | Faith, Amanda | 34 | (95) | (123) | (146) | (140) | (140) | (147) | (138) | (153) | (131) | (131) | (131) |
| 106 | Fenderson, Geneva | 77 | 13 | 13 | 11 | 10 | (15) | (172) | (156) | (180) | (164) | (164) | (164) |
| 450 | Ferguson, Cynthia | 62 | 16 | 4 | (130) | 46 | 86 | (165) | (150) | (177) | (164) | (164) | (164) |
| 699 | Fitzgerald, Jackie | 0 | 2 | 33 | 37 | 34 | 34 | 36 | 17 | 4 | 75 | 75 | 75 |
| 672 | Fleming, Daryl[1] | 58[1] | 60[1] | 29[1] | 34 | (11)[2] | (19) | (53) | (48) | (55) | (96) | (146) | (146) |
| 438 | Freeman, Kenneth | (79) | (95) | (91) | (131) | (117) | (119) | (124) | (114) | (131) | (119) | (129) | (131) |

[1] Example: Fleming Daryl, shown as over scheduled for the months of Dec, Jan and March
[2] Starting in April, he has hours available for work on other projects
\* Based on parameters established by the user, each employee's assigned hours are compared to his actual available
\* (Action maybe required to re-apportion the workload)

Table 3 is a report that summarizes staff availability. Each staff member's workload appears on the report. The report shows at a glance whether each employee is overscheduled or under scheduled and therefore who is available for potential projects. This information is critical in preventing employee burnouts.

TABLE 4

Revenue Projections Report

| Sr. No. | Project Name | Project Number | Billing Dept. Group | Focus Market | Total Net Fee | Net Architectural Fees In Billing Dollars ($) | | | |
|---|---|---|---|---|---|---|---|---|---|
| | | | | | | Dec 2004 Rev | 2004 Rev. Dec-Dec[1] | 2005 Rev. Jan-Dec[1] | 2006 Rev. Jan-Dec[1] |
| | | | | Department: Architecture[2] | | | | | |
| 1 | Allendale County - Courthouse SD-CA (A) | 23225.01 | 1 A | GV | 640,104.00 | 14,973.52 | 14,973.52 | 80,463.74 | 45,567.34 |
| 2 | Andrews - Neurosciences (A) | 24226.00 | 1 A | M | 41,000.00 | 2,164.81 | 2,164.81 | 9,151.23 | 0.00 |
| 3 | Andrews - OR Addition and Remodel (A) | 24239.00 | 1 A | M | 30,000.00 | 1,320.00 | 1,320.00 | 3,360.01 | 0.00 |
| 4 | Andrews - Ramp Entrance (A) | 24260.00 | 1 A | M | 10,000.00 | 0.00 | 0.00 | 0.00 | 0.00 |
| 5 | Bakersfield - 4th St E (2A)(A) | 23229.00 | 4 A | C | 45,202.00 | 6,429.61 | 6429.61 | 17,016.26 | 994.45 |
| | | | | | 766,306.00 | 24,887.94 | 24,887.94 | 109,991.24 | 46,561.79 |
| | | | | Department: Engineering[2] | | | | | |
| 1 | Allendale County - Courthouse SD-CA (E) | 23225.01 | 1 E | GV | 127,500.00 | 15,648.93 | 15,648.93 | 68,325.90 | 9,904.53 |
| | | | | | 127,500.00 | 15,648.93 | 15,648.93 | 68,325.90 | 9,904.53 |
| | | | | Department: Interior[2] | | | | | |
| 1 | Asheville Veterans Home - Medical Clinic (I) | 98243.03 | 1 I | M | 15,340.00 | 0.00 | 0.00 | 0.00 | 0.00 |
| 2 | Auburn Center - Executive Room Renov (I) | 24213.00 | 1 I | C | 15,000.00 | 0.00 | 0.00 | 0.00 | 0.00 |
| | | | | | 30,340.00 | 0.00 | 0.00 | 0.00 | 0.00 |
| | | Total | [181] | | 21,531,427.94 | 712,456.63 | 712,456.63[3] | 4,375,144.54[3] | 426,267.76[3] |

The immediate availability of accurate revenue projections
[1]Projections for current and subsequent years
[2]Sub-totals by user defined departments
[3]Summary projections for all departments Table 4 is a report that summarizes revenue projections. Revenues for the Allendale County Courthouse and all other projects appear on this report. An accurate projection of revenues for current and subsequent years is dynamically available. Decision enabling sub-totals are provided.

TABLE 5

Workload Summary Report

| Header | Dec | Jan | Feb | Mar | Apr | May | Jun | Jul | Aug | Sep | Oct | Nov |
|---|---|---|---|---|---|---|---|---|---|---|---|---|
| (A) Scheduled Hours | 11,564[1] | 11,423[1] | 10,241[1] | 10,336 | 8,716 | 7,348 | 4,595 | 3,180 | 3,409 | 2,121 | 1,326 | 1,276 |
| (B) Budgeted Billing Hours | 9,893 | 9,981 | 9,506 | 10,931 | 9,981 | 9,981 | 10,456 | 9,506 | 10,931 | 9,981 | 9,981 | 9,981 |
| (C) Vacation Hours (Adjusted for BUR) | 80[2] | 164[2] | 12[2] | 62 | 39 | 62 | 23 | 66 | 55 | 46 | 39 | 73 |
| (D) Available work hours (B-C) | 9,814 | 9,817 | 9,493 | 10,869 | 9,942 | 9,918 | 10,433 | 9,440 | 10,877 | 9,935 | 9,942 | 9,907 |
| (E) Variance (A-D) | 1,750[3] | 1,606[3] | 748[3] | (5,33)[4] | (1,226)[4] | (2,570)[4] | (5,838)[4] | (6260)[4] | (7,468)[4] | (7,814)[4] | (8,616)[4] | (8,631)[4] |
| (F) Additional Hours Required (Per Staff Per Day) | 1 | 1 | 1 | 0 | 0 | 0 | 0 | 0 | 0 | 0 | 0 | 0 |

[1]For the months of Dec, Jan & Feb the scheduled hours exceed the available hours
[2]Further, accounting for the staff members scheduled vacation . . .
[3]The hours over scheduled for these 3 months is shown as variance
[4]From March onwards the workload is under scheduled
* In this report the scheduled and the Budgeted (available) Billing hours are compared Table 5 is a report that accurately summarizes projected workloads. This report dynamically compares scheduled with the budgeted available hours. Decisions regarding future staff requirements, increases or decreases, can be made The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

The invention claimed is:

1. A computer program product comprising computer readable code stored on a storage medium, which when executed by a computer processor, performs the following steps:

for each project of a plurality of projects and for each of a plurality of staff members assigned to the plurality of projects, performing the following steps:
a) inputting the available fees for each project, wherein the available fees are an independent fixed constraint;
b) dividing each project into phases;
c) determining the direct labor derived from available fees, profitability, overhead, and expenses; wherein the direct labor is a dependent variable constraint; and wherein the direct labor is determined according to the formula Direct Labor=Available Fees−(Profitability+Overhead+Expenses);

d) inputting the percentage of fees assigned to each phase of each project;
e) determining the labor amount for each phase by multiplying the direct labor by the percentage of fees assigned to each phase;
f) inputting the staff members assigned to each phase;
g) inputting the percentage of each project's phase assigned to each staff member;
h) inputting the hourly billing rate for each staff member;
i) determining the labor rate for each staff member for each phase by multiplying the staff member's hourly billing rate by the phase percentage assigned to that staff member;
j) determining the total labor rate for all staff members for each project phase by adding all the labor rates for the staff members assigned to each project phase; and
k) calculating the total number of staff hours per phase by dividing the labor amount for each phase by the corresponding total labor rate for each phase;
l) calculating the hours per each project's phase assigned to each staff member by multiplying the staff member's phase percentage by the total staff hours per phase;
m) calculating the scheduled hours per day that a staff member is assigned to each project's phases by determining the net working days available for each phase from the start date and the end date of each phase by:
  i) inputting the start and the end date for the phase;
  ii) evaluating the number of total days in a phase;
  iii) splitting the total number of days into months;
  iv) testing for holidays in each month;
  v) determining if any holidays fall on weekends;
  vi) stripping all weekday holidays; and
  vii) stripping all weekends; and
  vii) dividing the total hours per phase assigned to that staff member by the net working days for each phase;
n) determining a scheduled hours per month for each staff member based on the scheduled hours per day determined in step m) and determining an available hours per month for each staff member;
o) generating a report showing each staff member's net availability for the plurality of projects including a calculated amount each staff member's available hours per month is above or below the scheduled hours per month for the plurality of projects to provide an indication of a staff member being respectively under-scheduled or over-scheduled.

* * * * *